US012703040B2

(12) United States Patent
Oving

(10) Patent No.: US 12,703,040 B2
(45) Date of Patent: Aug. 11, 2026

(54) ELECTRON BEAM WELDING APPLIANCE

(71) Applicant: TECHMETA ENGINEERING SAS, Epagny Metz-Tessy (FR)

(72) Inventor: Peter Oving, Voreppe (FR)

(73) Assignee: TECHMETA ENGINEERING SAS, Epagny Metz-Tessy (FR)

( * ) Notice: Subject to any disclaimer, the term of this patent is extended or adjusted under 35 U.S.C. 154(b) by 914 days.

(21) Appl. No.: 17/612,906

(22) PCT Filed: May 20, 2020

(86) PCT No.: PCT/EP2020/064031
§ 371 (c)(1),
(2) Date: Nov. 19, 2021

(87) PCT Pub. No.: WO2020/234334
PCT Pub. Date: Nov. 26, 2020

(65) Prior Publication Data

US 2022/0241888 A1 Aug. 4, 2022

(30) Foreign Application Priority Data

May 21, 2019 (FR) ...................................... 1905311

(51) Int. Cl.
*B23K 15/00* (2006.01)
*B23K 15/04* (2006.01)
(Continued)

(52) U.S. Cl.
CPC ...... *B23K 15/0053* (2013.01); *B23K 15/0006* (2013.01); *B23K 15/0013* (2013.01);
(Continued)

(58) Field of Classification Search
CPC ............ B23K 15/0053; B23K 15/0006; B23K 15/0013; B23K 15/002; B23K 15/0026; B23K 15/04; B23K 15/06; B23K 2101/06
(Continued)

(56) References Cited

U.S. PATENT DOCUMENTS 3,371,206 A * 2/1968 Takizawa .............. H01J 37/153
219/121.28
3,555,347 A * 1/1971 Dickinson ............... H01J 37/02
315/369
(Continued)

FOREIGN PATENT DOCUMENTS

CN 1061316 A 5/1992
CN 203863211 U 10/2014
(Continued)

OTHER PUBLICATIONS

Office Action dated Aug. 22, 2023, issued in counterpart IN application No. 202117058557. (5 pages).
(Continued)

*Primary Examiner* — Elizabeth M Kerr
*Assistant Examiner* — Simpson A Chen
(74) *Attorney, Agent, or Firm* — WHDA, LLP

(57) ABSTRACT

An electron beam welding appliance (10), characterised in that it comprises: an electron gun (11) capable of generating an electron beam (FE); a focusing means (12) capable of orienting the electron beam along a first axis (Z); an arm (13) extending parallel to the first axis, the arm comprising: a means (14) for converting a density distribution of the electron beam in a plane perpendicular to the first axis (Z); and a means (15) for bypassing the electron beam along a second axis (X) substantially perpendicular to the first axis.

19 Claims, 6 Drawing Sheets

(51) Int. Cl.
*B23K 15/06* (2006.01)
*B23K 101/06* (2006.01)

(52) U.S. Cl.
CPC ........ *B23K 15/002* (2013.01); *B23K 15/0026* (2013.01); *B23K 15/04* (2013.01); *B23K 15/06* (2013.01); *B23K 2101/06* (2018.08)

(58) Field of Classification Search
USPC ...................................................... 219/121.14
See application file for complete search history.

(56) References Cited

U.S. PATENT DOCUMENTS

| | | | | | |
|---|---|---|---|---|---|
| 4,211,516 | A * | 7/1980 | Speil | F01D 5/225 416/213 R |
| 4,348,576 | A | 9/1982 | Anderl et al. | |
| 4,638,142 | A * | 1/1987 | Puisais | B23K 37/0531 219/121.13 |
| 4,914,268 | A * | 4/1990 | Hixon | B23K 26/24 219/121.64 |
| 5,239,157 | A | 8/1993 | Sakano et al. | |
| 5,811,055 | A * | 9/1998 | Geiger | B23K 9/325 266/49 |
| 6,300,730 | B1 * | 10/2001 | Perreaut | H01J 29/566 315/368.28 |
| 2004/0129686 | A1 | 7/2004 | Murphy | |
| 2016/0124026 | A1 * | 5/2016 | Mullen | H01J 37/02 324/403 |
| 2016/0339536 | A1 * | 11/2016 | Goto | H01J 37/3023 |
| 2018/0147655 | A1 | 5/2018 | Ackelid | |
| 2019/0193192 | A1 * | 6/2019 | Fager | H01J 37/063 |

FOREIGN PATENT DOCUMENTS

| | | | | |
|---|---|---|---|---|
| DE | 3537559 | A1 | 4/1986 | |
| EP | 0013573 | A1 | 7/1980 | |
| EP | 2522992 | A2 | 11/2012 | |
| EP | 2 571 337 | A1 | 3/2013 | |
| GB | 2165989 | A | 4/1986 | |
| JP | S5691989 | A * | 7/1981 | B23K 15/00 |
| JP | 2000-260599 | A | 9/2000 | |
| KR | 10-2004-0063812 | A | 7/2004 | |
| KR | 100513530 | B1 | 9/2005 | |
| KR | 10-2006-0032137 | A | 4/2006 | |

OTHER PUBLICATIONS

International Search Report dated Oct. 2, 2020, issued in counterpart International Application No. PCT/EP2020/064031 (2 pages)(English language).
Office Action dated Nov. 20, 2024, issued in KR Application No. 10-2021-7040674, with English translation. (15 pages).
Office Action dated Nov. 3, 2022, issued in counterpart CN Application No. 202080047418.1, with English Translation. (22 pages).
Brief communication—Opposition proceedings dated Mar. 19, 2025, issued in European counterpart application No. 20728692.3 with English machine translation of relevant portions (24 pages).
Besuchsbericht. (14 pages) cited in EP Office Action dated Mar. 19, 2025—brief summary of relevance in non-patent literature document No. 1.
Anlage KBS4. (1 page) cited in EP Office Action dated Mar. 19, 2025—brief summary of relevance in non-patent literature document No. 1.
Grad ablenkung, 902-Grad Ablenkung Siebdruck Frontplatte. (1 page) cited in EP Office Action dated Mar. 19, 2025—brief summary of relevance in non-patent literature document No. 1.
Wikipedia becktronenstrahl, Elektronenstrahl—Materialbearbeitung, Apr. 12, 2024, 10:46. (15 pages) cited in EP Office Action dated Mar. 19, 2025—brief summary of relevance in non-patent literature document No. 1.
Témoignage_PTR (Bernhard Jung), Eidesstattliche Versicherung. (16 pages) cited in EP Office Action dated Mar. 19, 2025—brief summary of relevance in non-patent literature document No. 1.
Témoignage_Zanon (Mauro Festa), Declaration in Lieu of Oath. (23 pages) cited in EP Office Action dated Mar. 19, 2025—brief summary of relevance in non-patent literature document No. 1.
Engel, Thomas; Das Elektronenstrachlschweissen Grundlagen und Anwendungen Teil 1, Elektronenstrachlschweissen. (4 pages) cited in EP Office Action dated Mar. 19, 2025—brief summary of relevance in non-patent literature document No. 1.

* cited by examiner

16
FE
x
y
z 153
154
158
151
x
y
z 31
18
14
33
32
16
y
z
x 158
151
y
z
x

ELECTRON BEAM WELDING APPLIANCE

The present application is a U.S. national stage of and claims priority to PCT application No. PCT/EP2020/064031, filed May 20, 2020, claiming priority to French application No. FR1905311, filed May 21, 2019, the entire disclosures of which prior applications are incorporated herein by reference.

TECHNICAL FIELD OF THE INVENTION

The invention relates to an electron beam welding apparatus. The invention also relates to a welding device comprising such a welding apparatus. The invention furthermore relates to a method for welding two parts having a central aperture by way of such a welding apparatus or by way of such a welding device.

PRIOR ART

Numerous techniques are nowadays available for assembling two parts through welding. Among these techniques, electron beam welding is a welding method that uses the interaction between an electron beam and the parts to be assembled. Electrons launched at high speed into a vacuum impact both parts at their interface. The significant kinetic energy of the electrons is then transformed into heat at the moment of impact, thereby causing the materials to melt and then to weld. The possibility of concentrating the electron beam on a narrow area makes it possible to obtain an assembly that exhibits a relatively small amount of deformation and in which the area that is thermally affected is limited. This technique is therefore preferred for assemblies that require high precision and high quality.

In particular, assembly by welding niobium cells forming a particle accelerator cavity has to be carried out with the greatest care so as to avoid any defect in the internal surface of the cells. Specifically, such defects could considerably reduce the performance of the particle accelerator.

The cells forming a particle accelerator cavity are axisymmetric parts that have a central aperture passing right through them. In order to obtain a surface state that is as good as possible for the assembly of two cells of a particle accelerator cavity, the welding should preferably be carried out from the inside, that is to say that the weld line should preferably be established along an internal perimeter of the cells to be assembled. The welding apparatus required for this operation should therefore be able to be inserted through the central aperture into the cells to be welded. To this end, it is known to use a welding apparatus comprising an arm that is intended to be inserted into the cells. The arm extends parallel to the axis of revolution of the cells to be welded, and it ends with an elbow that allows the electron beam to be oriented parallel to one of the radii of the cells.

Welding apparatuses known from the prior art produce a poorly controlled electron beam at output. In particular, the density distribution of the electron beam at the output of the welding apparatus may be poorly controlled, thereby leading to heating of an excessively wide or excessively narrow area at the interface between the two parts to be welded. The temperature reached by the metal may therefore also be poorly controlled. The weld bead may then exhibit defects in terms of shape or structure. Metal may also be projected during welding. These projections may then be deposited back on the two parts to be welded, thereby damaging them.

In addition, the axis of the electron beam may be influenced by a large number of operating parameters. The axis of the beam may then be offset with respect to the interface between the two cells to be welded, thereby also causing a weld defect.

Moreover, the arms fitted to existing welding apparatuses are often bulky. They are therefore not able to be inserted into parts that have a central aperture with a small diameter. The arms may also not be long enough to assemble a plurality of cells along their axis of revolution. A small diameter in combination with a large length of the arm causes a decrease in rigidity of the arm and, in general, worsened guidance of the electron beam. Reducing the diameter of the arm and increasing its length therefore appear to be incompatible with the precision of the electron beam.

Finally, a large number of manipulations are generally necessary in order to adjust the electron beam. In particular, it is often necessary to open the vacuum enclosure containing the welding apparatus in order to inspect the parts or to make adjustments. Opening the enclosure degrades the vacuum that is established there. The vacuum then has to be obtained again in order to be able to perform a welding operation. These interventions are therefore tedious and incompatible with industrial use of the welding device.

PRESENTATION OF THE INVENTION

The aim of the invention is to provide a welding apparatus that overcomes the above drawbacks and improves the welding apparatuses known from the prior art.

More precisely, a first subject of the invention is an electron beam welding apparatus capable of producing electron beams with varied and well-controlled density distributions.

A second subject of the invention is an electron beam welding apparatus capable of producing a perfectly positioned electron beam.

A third subject of the invention is an electron beam welding apparatus that is simple to configure and does not require opening the enclosure in which it is located in order to be adjusted.

A fourth subject of the invention is an electron beam welding apparatus that is particularly compact and makes it possible to weld, from the inside, two parts comprising a central aperture with a small diameter, the two parts also comprising a large length.

SUMMARY OF THE INVENTION

The invention relates to an electron beam welding apparatus comprising:

- an electron gun capable of generating an electron beam,
- a focusing means capable of orienting the electron beam along a first axis,
- an arm extending parallel to the first axis, the arm comprising:
- a transformation means for transforming a density distribution of the electron beam in a plane perpendicular to the first axis, and
- a deflection means for deflecting the electron beam along a second axis substantially perpendicular to the first axis.

The transformation means may comprise at least two coils, preferably at least four coils, in particular at least six coils, the at least two coils forming a magnetic axis substantially perpendicular to said first axis, the at least two coils being distributed about said first axis so as to produce an alternation of North magnetic poles and South magnetic poles.

The electron gun, the focusing means, the transformation means and the deflection means may be arranged in this order along the path of the electron beam, the focusing means comprising a variable focal length, the focusing means being capable of focusing the electron beam at a focal point positioned upstream of the transformation means and the focusing means being capable of focusing the electron beam at a focal point positioned downstream of the transformation means.

The deflection means may comprise a coil capable of producing a magnetic field oriented substantially perpendicular to said first axis when said coil is flowed through by an electric current, said coil being positioned substantially in the extension of the first axis, behind said second axis.

The deflection means may comprise a magnetic core arranged inside said coil, a first metal plate linked to the magnetic core by a first pole flank, a second metal plate linked to the magnetic core by a second pole flank, the first plate and the second plate being arranged symmetrically on either side of said first axis, the first plate and the second plate each comprising an entrance face and an exit face, the entrance face forming an angle of between 15° and 40° inclusive with said second axis, the exit face forming an angle of between 0° and 15° inclusive with said first axis.

The welding apparatus may comprise a video borescope for observing an impact of the electron beam, the video borescope extending substantially along an axis parallel to said first axis, the video borescope being positioned behind the deflection means within a volume defined by the projection of the deflection means along said first axis.

The video borescope may be able to be retracted parallel to the first axis, and it may be capable of extending between the first plate and the second plate.

The welding apparatus may comprise a protective diaphragm for protecting an element of the welding apparatus from the electron beam in the event of accidental deflection of the electron beam, and/or, it may comprise a magnetic field blocking element interposed between the transformation means and the deflection means, and/or, it may comprise a heat shield, in particular a heat shield that is cooled by a cooling system, and/or, it may comprise a protective cover positioned so as to protect a part to be welded and/or an element of the welding apparatus from metal projections coming from a part to be welded.

The arm may comprise the overall shape of a cylinder, said cylinder comprising an axis of revolution offset by a non-zero value with respect to said first axis, and/or said cylinder comprising a diameter less than or equal to 80 mm, in particular less than or equal to 70 mm, preferably less than or equal to 60 mm, and/or said cylinder comprising a length along said first axis greater than or equal to 200 mm, in particular greater than or equal to 400 mm, preferably greater than or equal to 600 mm.

The welding apparatus may comprise:

a deflecting means for deflecting the electron beam, and a detection means for detecting the position of the electron beam, the detection means comprising two electrodes arranged on either side of the first axis, each electrode being capable of detecting contact with the electron beam.

The welding apparatus may comprise:

a deflecting means for deflecting the electron beam, and a detection means for detecting the position of the electron beam, the detection means comprising four electrodes arranged on the four sides of a square about the first axis, each electrode being capable of detecting contact with the electron beam.

The invention also relates to a welding device comprising a frame intended to rest on a ground and a welding apparatus as defined above, the welding apparatus being able to move in rotation about said first axis with respect to the frame.

The invention also relates to a method for welding two parts comprising a central aperture, by way of an electron beam generated by a welding apparatus as defined above or by way of a welding device as defined above, the welding method comprising:

a step of positioning the two parts that are intended to be welded to one another around the arm of the welding apparatus, a step of calibrating the transformation means so as to produce an electron beam comprising a predefined density distribution at the output of the welding apparatus, a step of projecting an electron beam onto an interface formed between the two parts.

The calibration step may be defined so as to produce an electron beam the density of which is distributed either parallel to an interface formed between the two parts or perpendicular to an interface formed between the two parts, or in a circular and uniform manner, or in any intermediate form between a distribution parallel to the interface and a circular and uniform distribution, or in any intermediate form between a distribution perpendicular to the interface and a circular and uniform distribution, and the projection step may be a step of welding the two parts, in particular a keyhole weld, or a step of smoothing a weld, or a step of locally repairing a weld, in particular a step of treating the end of the bead of a weld.

The calibration step may be defined so as to produce an electron beam the density of which is distributed perpendicular to an interface formed between the two parts, and the projection step may be a step of smoothing a weld formed beforehand between the two parts.

The calibration step may be defined so as to produce an electron beam the density of which is distributed in a circular and uniform manner, and the projection step may be a step of locally repairing a weld or a step of treating the end of the bead of a weld, the power of the electron beam in particular being gradually reduced to zero when the electron beam reaches the end of the weld bead.

The electron gun may comprise an anode and a cathode, a voltage between the anode and the cathode being less than or equal to 60 kV, in particular less than or equal to 45 kV during the projection step.

The invention also relates to a method for adjusting a welding apparatus as defined above, the adjustment method comprising:

a step of deflecting the electron beam in an oscillating manner, the electron beam oscillating in a first plane defined between a first electrode and a second electrode of the detection means, the second electrode being opposite the first electrode with respect to the electron beam, the amplitude of the oscillation increasing over time, and then a step of detecting contact of the electron beam on an electrode from among the first electrode and the second electrode, and then a step of deflecting the electron beam in an oscillating manner, the electron beam oscillating in the first plane, the amplitude of the sinusoid being kept at the value reached at the time when the electron beam comes into contact on said electrode, a first offset that increases over time being applied to the electron beam so as to gradually shift it toward the other electrode from among the first electrode and the second electrode, and then a step of detecting contact of the electron beam on said other electrode, and then a step of centering the electron beam by shifting the electron beam toward said other electrode by a value equal to the first offset applied to the electron beam at the time when it comes into contact with said other electrode divided by two.

The adjustment process may also comprise:

a step of deflecting the electron beam in an oscillating manner, the electron beam oscillating in a second plane defined between a third electrode and a fourth electrode of the detection means, the fourth electrode being opposite the third electrode with respect to the electron beam, the second plane being perpendicular to the first plane, the amplitude of the oscillation increasing over time, and then a step of detecting contact of the electron beam on an electrode from among the third electrode and the fourth electrode, and then a step of deflecting the electron beam in an oscillating manner, the electron beam oscillating in the second plane, the amplitude of the oscillation being kept at the value reached at the time when the electron beam comes into contact on said electrode, a second offset that increases over time being applied to the electron beam so as to gradually shift it toward the other electrode from among the third electrode and the fourth electrode, and then a step of detecting contact of the electron beam on said other electrode, and then a step of centering the electron beam by shifting the electron beam toward said other electrode by a value equal to the second offset applied to the electron beam at the time when it comes into contact with said other electrode divided by two.

PRESENTATION OF THE FIGURES

These subjects, features and advantages of the present invention will be explained in detail in the following description of one particular embodiment, which is given without limitation with reference to the accompanying figures, in which.

Figure 14:
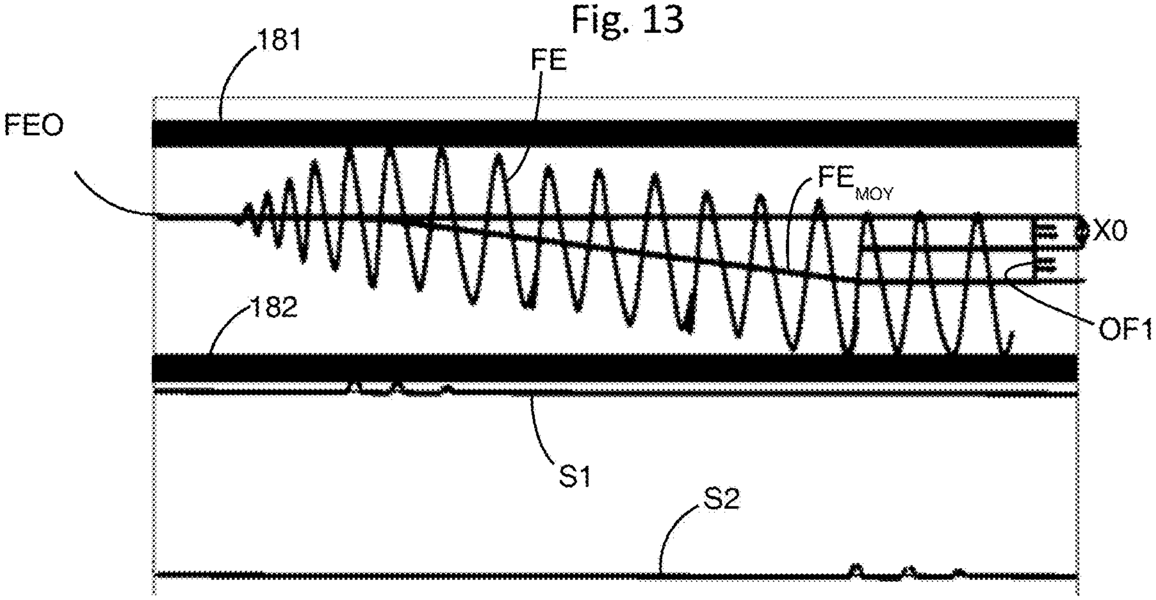

FIG. 14 comprises two graphs illustrating a method for centering the electron beam.

Figure 15:
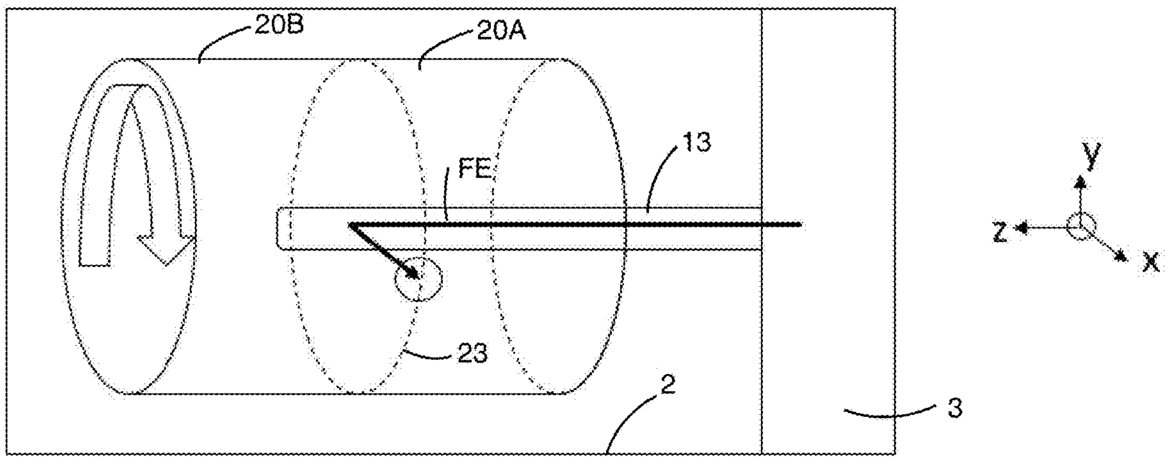

FIG. 15 is a schematic view of the welding device during a welding operation.

Figure 15A:
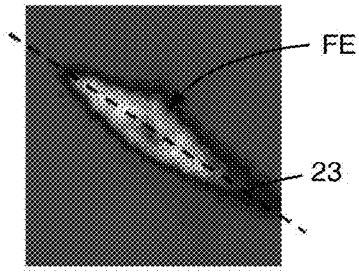

FIG. 15A is a depiction of a first projection of an electron beam onto an interface between two parts to be welded.

Figure 15B:
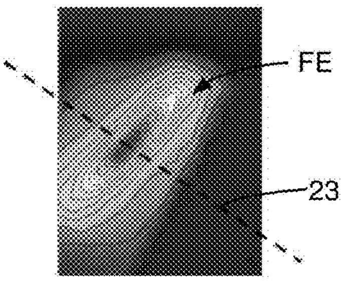

FIG. 15B is a depiction of a second projection of an electron beam onto the interface between the two parts to be welded.

Figure 15C:
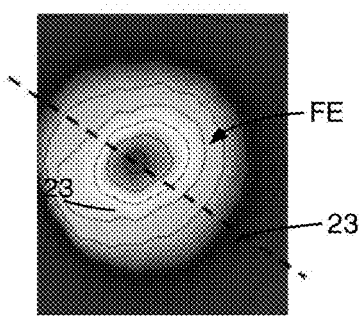

FIG. 15C is a depiction of a third projection of an electron beam onto the interface between the two parts to be welded.

Figure 16:
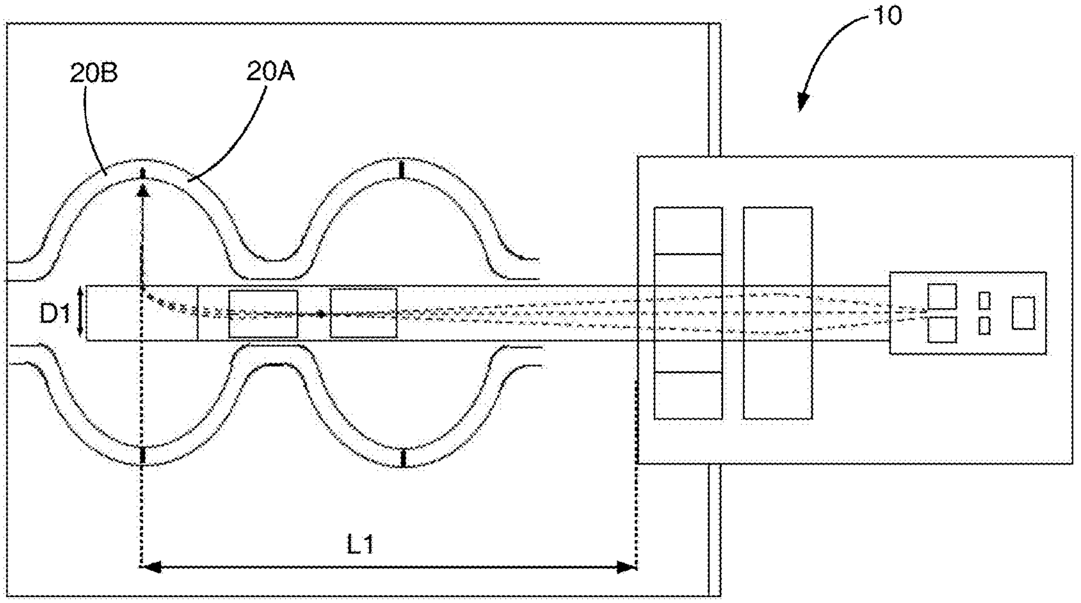

FIG. 16 is a second sectional plan view of the welding device.

DETAILED DESCRIPTION

Figure 1:
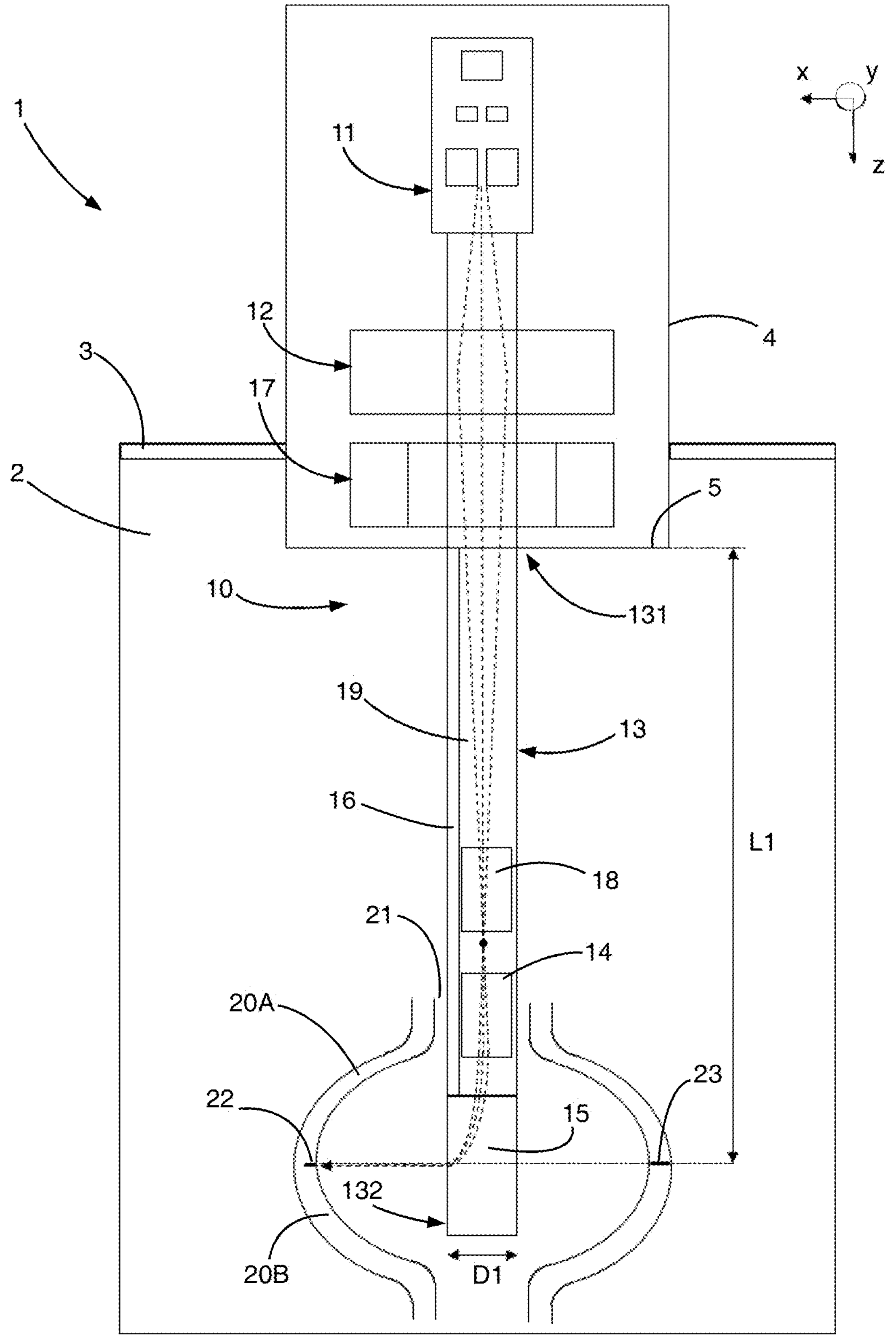
FIG. 1 is a sectional plan view of a welding device according to one embodiment of the invention.

FIG. 1 schematically illustrates a welding device 1 equipped with a welding apparatus 10 according to one embodiment of the invention. The welding device 1 furthermore comprises an enclosure 2 enveloping the welding apparatus 10 and a frame 3. The welding device 1 may be installed in a workshop and rest on the ground by way of its frame 3.

The welding apparatus 10 is an electron beam welding apparatus. This means that it is capable of projecting an electron beam FE onto a part to be welded in order to melt it locally. The electron beam is a flow of electrons that is projected onto the part to be welded. The energy dissipated by the impact of the electrons on the part to be welded causes heating and therefore causes local melting of the material. The power of the welding apparatus is particularly suitable for welding metal parts, for example parts made of niobium, of copper, of aluminum or of any other type of metal. The welding apparatus 10 is in particular suitable for welding two parts 20A, 20B having a central aperture 21 by being inserted into this central aperture. The two parts 20A, 20B are welded to one another by virtue of a weld bead 22 formed at their interface 23. The interface 23 denotes the seal, or in other words the joining line separating the two parts 20A, 20B. This interface 23 corresponds to an internal perimeter of the two parts when this interface is circular.

Electron beam welding requires the electron beam to propagate in a vacuum. The enclosure 2 may therefore be hermetically sealed around the parts to be welded and the welding apparatus, and a vacuum pump may then create a vacuum in the enclosure. An order of magnitude of the negative pressure level reached in the enclosure may for example be between 10-2 mBar and 10-6 mBar.

The two parts 20A, 20B may be of any kind. Advantageously, the two parts may be cells, cell halves, or an assembly of cell elements that are intended to form a particle accelerator cavity. They may be made of niobium. Welding two cell halves makes it possible to obtain a cell as shown schematically and by way of example in FIG. 1. Such cells may be assembled in series so as to form a cavity with which a particle accelerator is equipped. In FIG. 1, the assembly formed by the two cell halves 20A, 20B has the shape of an axisymmetric ellipsoid, and the weld bead 22 is established level with the largest internal perimeter of the cell. As a variant, the shape of the parts could be different; they could in particular be simply tubular.

According to another variant, the two parts to be welded might not be axisymmetric parts, or at the very least the interface 23 between the two parts 20A, 20B might not plot a circle. In this case, the distance traveled by the electron beam before impacting the two parts to be welded could be variable depending on the orientation of the parts to be welded. In particular, a part with a variable radius could be welded by modifying the operating parameters of the electron beam.

Figure 2:
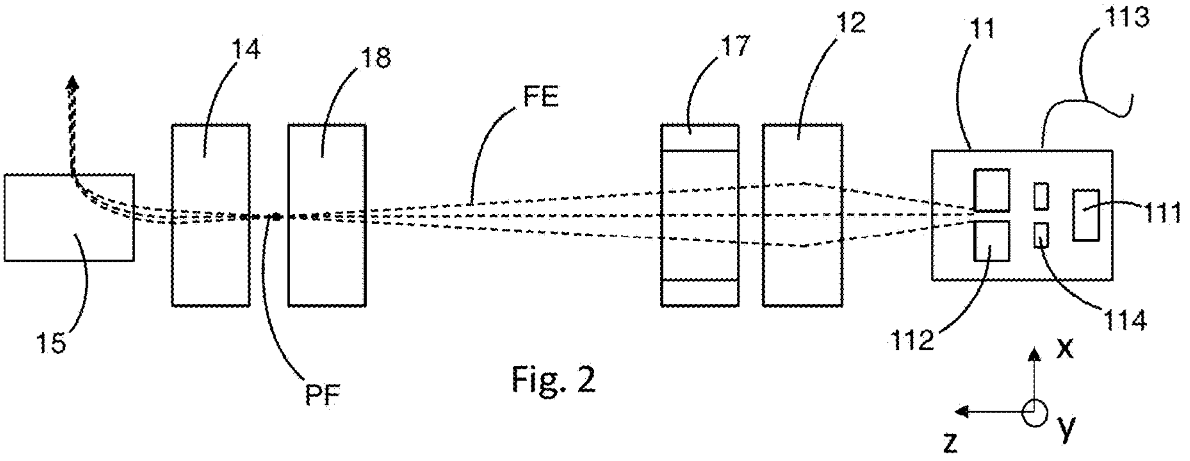
FIG. 2 is a schematic plan view of the welding device.

The welding apparatus 10 comprises in particular an electron gun 11, a focusing means 12 and an arm 13. The arm comprises in particular a transformation means 14 for transforming the electron beam and a deflection means 15 for deflecting the electron beam. As may be seen in the schematic depiction of the welding apparatus in FIG. 2, the electron gun 11, the focusing means 12, the transformation means 14 and the deflection means 15 are arranged in this order along the path of the electron beam FE.

The electron gun 11 is a means that is capable of generating the electron beam FE. It may in particular comprise a cathode 111, an anode 112, and optionally a Wehnelt cylinder 114 interposed between the cathode and the anode. The cathode is capable of emitting electrons. It may for example be in the form of a filament or of a solid or hollow emitting part. For example, the electrons may be extracted from a hot thermo-emissive or gaseous cathode. The Wehnelt cylinder makes it possible to regulate the quantity of electrons emitted by the cathode. In particular, the voltage difference between the Wehnelt cylinder and the cathode makes it possible either to block the electrons and to prevent the emission of the electron beam, or to allow through part or all of the flow of electrons emitted by the cathode. The anode is capable of attracting electrons by virtue of a voltage U applied between the cathode and the anode. The voltage U between the anode and the cathode may for example reach a value of the order of several tens of kilovolts. The welding device therefore comprises a power supply means 113 that is able to be connected to an electricity distribution grid. The anode, the Wehnelt cylinder and the cathode may be assembled so as to be mechanically aligned along a first axis Z. It is thus possible to obtain, at the output of the electron gun 11, an electron beam with optimum rotational symmetry about the axis Z. Advantageously, during a welding process, the voltage is less than or equal to 80 kV, preferably less than or equal to 60 kV, or even less than or equal to 45 kV. The welding apparatus therefore requires a relatively low voltage in comparison with other electron beam welding devices from the prior art. Using a lower voltage has a large number of advantages, including a lower generation of X-rays, this therefore requiring simpler protection mechanisms for operators working with this welding device 1. In addition, a lower voltage makes the electron beam easier to deflect, thereby making it possible to consider miniaturizing the elements forming the welding apparatus 10, in particular miniaturizing the transformation means 14 and the deflection means 15. As a variant, the electron beam could be generated differently, for example by way of a plasma cathode in which electrons are extracted from a plasma.

Figure 3:
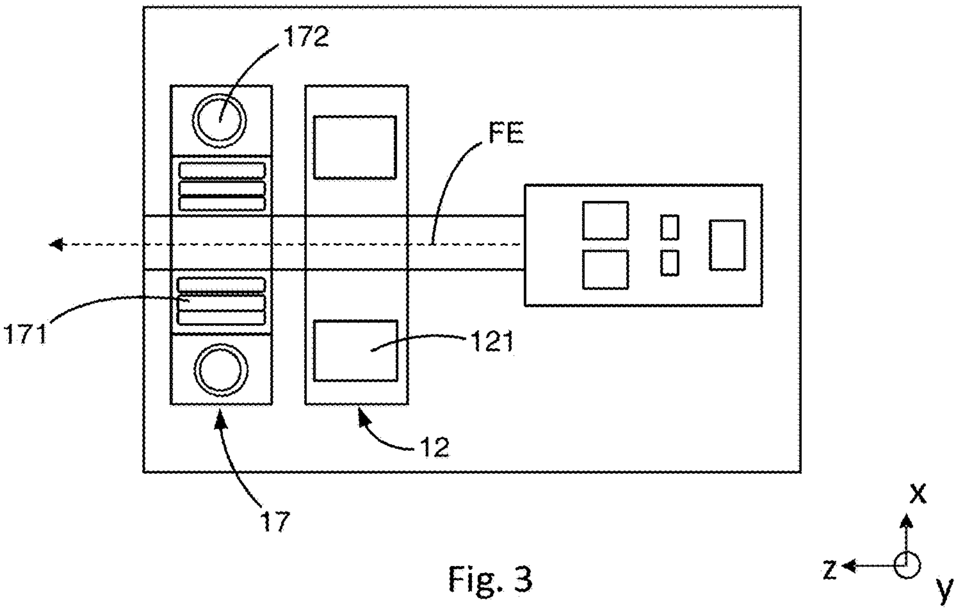
FIG. 3 is a sectional plan view of a first portion of a welding apparatus according to one embodiment of the invention.

The focusing means 12 is clearly visible in FIG. 3. It is capable of focusing the electron beam coming from the electron gun 11 along the first axis Z. More particularly, the focusing means is capable of transforming an electron beam that diverges upstream into an electron beam that converges downstream, while at the same time maintaining the rotational symmetry of the beam. The focusing means may in particular comprise a coil 121 arranged about the first axis Z. A coil is a solenoid, or in other words a set of turns able to be flowed through by an electric current. The coil 121 may comprise an annular magnetic core whose axis of revolution is the axis Z. When an electric current flows through the coil, a magnetic field occurs. Inside the coil, the field lines may be oriented substantially parallel to the axis of the coil, that is to say to the axis Z. Under the effect of the Lorentz force, the magnetic field produced by the coil exerts a force on the electrons that modifies their trajectory. The magnetic field generated by the coil 121 is thus able to focus the electric beam toward a focal point PF downstream of the focusing means. This focal point PF is illustrated in particular in FIG. 2. The focal point is positioned on the axis Z. The distance from the focal point to the coil 121 depends in particular on the voltage U and on the current flowing in the coil 121. The focal point PF may thus be adjusted and be positioned upstream of the transformation means 14 or downstream of the transformation means 14 or in any intermediate position.

The electron gun 11 and the focusing means 12 (along with the deflecting means 17, which will be presented later) may be grouped together in a housing 4 (or in other words a casing) integral with the frame 3. This housing 4 comprises a reference face 5, substantially perpendicular to the axis Z and from which the arm 13 extends.

The arm 13 extends parallel to the first axis Z from the reference face 5. It therefore comprises a first end 131 fastened to the housing 4 and a second, free end 132. By convention, "rear" denotes the side of the first end and "front" denotes the side of the second end. The arm 13 comprises a tubular portion 19 inside which the electron beam propagates. The tubular portion 19 splits the welding apparatus into two parts. A first portion, outside the arm 13 and illustrated in FIG. 3, comprises in particular the electron gun 11 and the focusing means 12. A second portion, integrated into the arm 13 and illustrated in FIG. 4, comprises in particular the transformation means 14 and the deflection means 15.

The arm 13 comprises the overall shape of a cylinder. This cylinder may have a diameter (indicated by D1 in FIG. 1) of less than or equal to 80 mm, in particular less than or equal to 70 mm, preferably less than or equal to 55 mm.

It is possible to define an orthogonal reference frame formed by the first axis Z, a second axis X and a third axis Y. The axes X, Y and Z are therefore perpendicular to one another. The axis X corresponds to the axis along which the electrons are projected at the output of the welding apparatus. The electron beam therefore undergoes a 90° deflection. This deflection is carried out by the deflection means 15, which will be detailed below. By convention, the terms "upstream" and "downstream" are defined in this document along the direction of propagation of the electrons, the electrons propagating from upstream to downstream.

It is possible to define a functional length L1 of the arm along the axis Z as the distance between the reference face 5 and the axis X along which the electron beam is deflected by the deflection means 15. The functional length L1 may be greater than or equal to 200 mm, in particular greater than or equal to 400 mm, preferably greater than or equal to 600 mm, or even greater than or equal to 700 mm. The arm 13 is intended to be inserted inside the assembly formed by the two axisymmetric parts 20A, 20B so as to produce the weld bead 22 along an internal perimeter, at the interface between the two parts 20A, 20B.

Figure 5A:
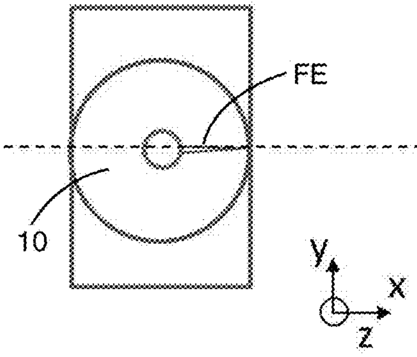
FIG. 5A is a schematic front view of the welding apparatus, an electron beam coming from the welding apparatus being oriented horizontally.
Figure 5B:
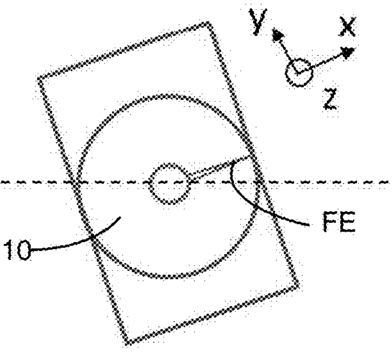
FIG. 5B is a schematic front view of the welding apparatus, the electron beam being inclined slightly upward with respect to the horizontal.
Figure 5C:
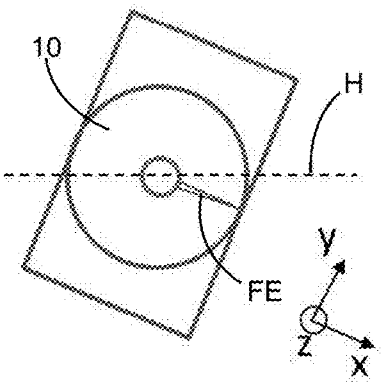
FIG. 5C is a schematic front view of the welding apparatus, the electron beam being inclined slightly downward with respect to the horizontal.

The orientation of the welding device may be chosen so that the axis X is a horizontal or substantially horizontal axis. However, as illustrated in FIGS. 5A, 5B and 5C, the welding device may advantageously comprise a rotational connection that rotates about the axis Z between the welding apparatus and the frame 3. This rotational connection makes it possible to incline the axis X along which the electron beam exits the welding apparatus to a greater or lesser extent with respect to the horizontal. The axis X along which the electron beam is emitted from the welding apparatus may thus form a zero angle (as illustrated in FIG. 5A), a positive angle (as illustrated in FIG. 5B), or even a negative angle (as illustrated in FIG. 5C) with the axis H, representing a horizontal axis. It is thus possible, by virtue of the effect of gravity on the molten material, to refine the appearance or the quality of the weld bead. This thus affords additional adjustment so as to prevent or minimize the formation of an elevation on the surface of the weld bead.

The axis Z may be horizontal or vertical. A horizontal positioning of the axis Z makes it possible to limit the vertical bulk of the welding device 1, this being particularly useful when the arm 13 is lengthy or when seeking to weld a particularly lengthy set of axisymmetric parts.

The transformation means 14 for transforming the electron beam FE is capable of varying (or in other words "modifying" or "changing") the density distribution of the electron beam in a plane perpendicular to the first axis Z. In particular, the transformation means 14 is capable of varying the density distribution of the electron beam along the second axis X and along the third axis Y. With the transformation means 14, the density distribution of the beam is able to be modified on demand. The beam may be either highly intense or more spread out and have a lower energy density. Each portion of the beam may undergo a different angular deflection along the axis X and/or along the axis Y, which may lead either to an increase in the density or to a decrease in the density of the electron beam. One portion of the beam may thus become convergent, while another portion of the electron beam may become divergent.

As a variant, the transformation means 14 could vary the density distribution of the electron beam along only one of these two axes X or Y, or even along any axis perpendicular to the axis Z that is not necessarily the axis X or the axis Y. The transformation means 14 may modify the density distribution of the beam without deflecting its overall trajectory. The beam thus overall remains oriented parallel to the axis Z downstream as well as upstream of the transformation means 14. The transformation means 14 is not a simple mask that would block a portion of the electron beam and that could then heat up to a great extent. The overall power of the electron beam is substantially identical upstream and downstream of the transformation means.

The density distribution of the electron beam denotes not only the shape of a cross section of the beam in a plane perpendicular to the axis Z, but also the distribution of electrons within this shape. For example, the transformation means 14 may modify an electron beam FE with a circular cross section and with a uniform distribution of electrons passing through the circular cross section into an electron beam with an ovoid or elongated cross section, also with a uniform distribution of electrons passing through the ovoid or elongated cross section. According to another example, the transformation means 14 may modify an electron beam FE with a circular cross section and with a uniform distribution of electrons passing through the circular cross section into an electron beam also with a circular cross section but with a non-uniform distribution of electrons (for example with a greater proportion of electrons passing through a first half of the cross section than electrons passing through the second half, which is complementary to the first half). The transformation means may simultaneously modify the orientation of the electrons forming the electron beam, the shape of the cross section of the electron beam and the distribution of the electrons within this cross section.

The transformation means 14 comprises at least two coils, preferably at least four coils, in particular at least six coils, or even any even number of coils. The coils comprise a magnetic axis substantially perpendicular to the axis Z and are distributed evenly about the axis Z so as to produce an alternation of North magnetic poles and South magnetic poles. The magnetic axes of the various coils are advantageously contained within one and the same plane perpendicular to the axis Z. The transformation means therefore comprises a given number of pairs of coils. The two coils of one and the same pair are positioned facing one another, along an axis perpendicular to the axis Z. The two coils of one and the same pair are therefore not positioned one behind the other along the axis Z.

Figure 6:
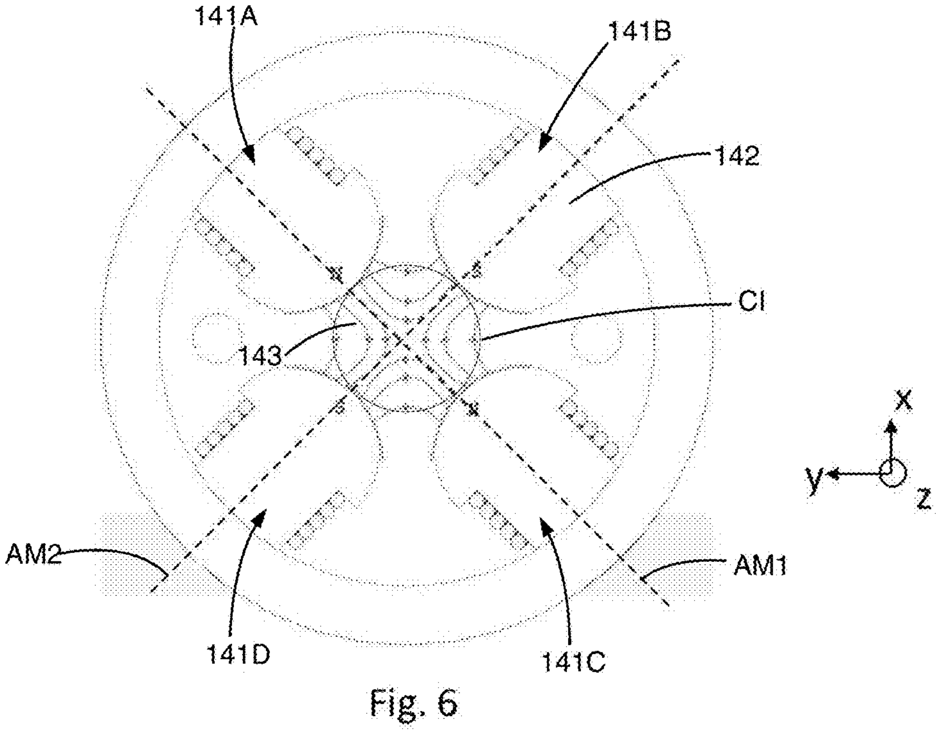
FIG. 6 is a sectional front view of a transformation means of the welding apparatus.

According to the embodiment illustrated in FIG. 6, the transformation means 14 is a quadrupole. It comprises four identical coils 141A, 141B, 141C, 141D that are arranged overall with 90° rotational symmetry. The magnetic axes of the two coils 141A and 141C are coincident along one and the same axis AM1. Likewise, the magnetic axes of the two coils 141B and 141D are coincident along one and the same axis AM2, perpendicular to the axis AM1. The same electric current flows in succession through the coils 141A, 141B, 141C and 141D. These four coils therefore comprise a single electric wire carrying the current in succession in these four coils. The winding direction of each coil is defined so as to produce an alternation of North and South polarity when a current flows through the electric wire. The two North magnetic poles (obtained with the coils 141A and 141C) are face to face and, likewise, the two South magnetic poles (obtained with the coils 141B and 141D) are face to face. Each coil 141A, 141B, 141C, 141D furthermore comprises a magnetic core 142, which may, at least locally, have the shape of an arc of a circle or of a hyperbola. The magnetic core comprises a body, for example of cylindrical or profiled shape, arranged inside each coil, and a head oriented toward the inside of the transformation means. An inscribed circle CI may be plotted so as to pass through the top of each head of the four magnetic cores. Advantageously, the ratio of a radius of curvature of the head of the magnetic cores to the radius of the inscribed circle CI may be between 1 and 1.3 inclusive. The magnetic core makes it possible to guide the magnetic field lines 143 produced by the four coils 141A, 141B, 141C, 141D. The magnetic field lines 143 are also shown in FIG. 6. They take the form of curved lines with an incidence perpendicular to the heads of the magnetic cores. The magnetic field lines start from the two heads of the North pole magnetic cores and are directed toward the two heads of the South pole magnetic cores. It should be noted that the axis AM1 or the axis AM2 may be parallel to the axis X or parallel to the axis Y, or else, as shown in FIG. 6, form an angle substantially equal to 45° with the axis X and with the axis Y. As a variant, the two axes AM1 and AM2 might not be perpendicular.

Using a quadrupole makes it possible to vary the density distribution of the electron beam along two separate axes. As a variant, if the transformation means were to comprise only two poles, it would still be possible to vary the density distribution along an axis perpendicular to the axis Z. According to another variant, the transformation means could be formed by a single coil the axis of which would be parallel to the axis Z, the electron beam passing through the center of this single coil. This single coil would therefore act as a second focusing means. This second focusing means would therefore be housed inside the arm (unlike the focusing means 12). Such a single coil would also make it possible to vary the density distribution of the electron beam.

Figure 7:
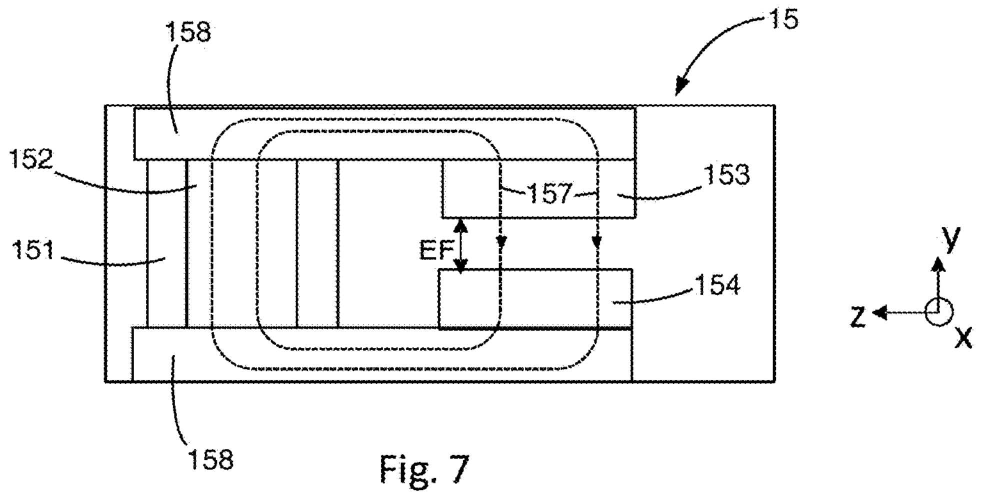
FIG. 7 is a sectional diagram of a deflection means of the welding apparatus.
Figure 8:
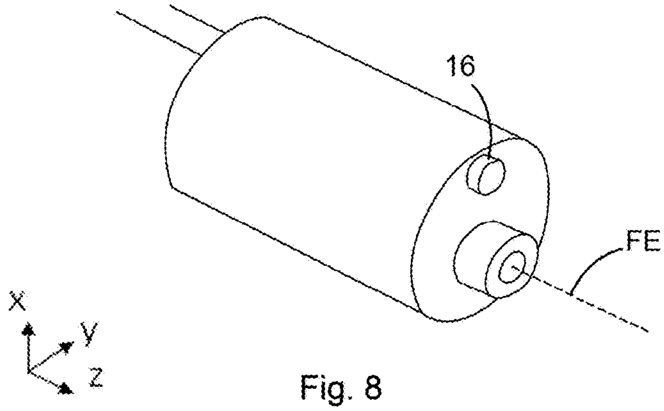
FIG. 8 is a first perspective view of a portion of an arm of the welding apparatus.
Figure 9:
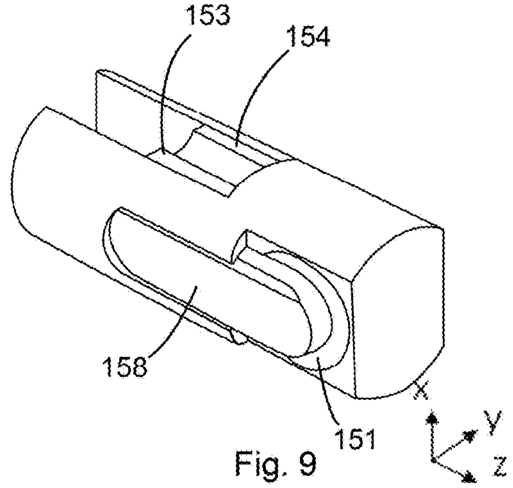
FIG. 9 is a first perspective view of the deflection means.
Figure 10:
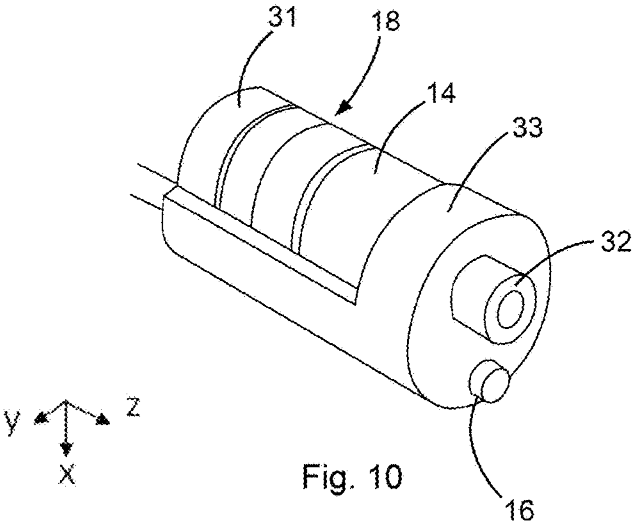
FIG. 10 is a second perspective view of said portion of an arm of the welding apparatus.
Figure 11:
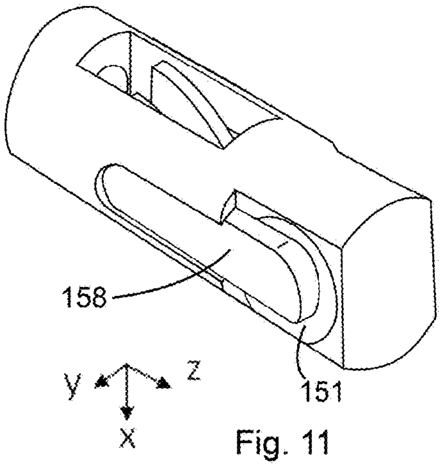
FIG. 11 is a second perspective view of the deflection means.

The deflection means 15 is in particular illustrated in FIG. 7, and also partially visible in FIGS. 8 to 11. It is capable of deflecting the electron beam FE from an orientation parallel to the axis Z upstream of the deflection means to an orientation parallel to the axis X downstream of the deflection means. The electron beam therefore undergoes a deflection substantially equal to 90° between the upstream side and downstream side of the deflection means. According to the embodiment that is presented, it comprises a single coil 151 the magnetic axis of which is substantially parallel to the axis Y. The coil is therefore capable of producing a magnetic field that is oriented at least locally parallel to the axis Y when it is flowed through by an electric current. The deflection means may thus also be classified as a dipole. The coil 151 is positioned substantially at the free end 131 of the arm 13, in the extension of the trajectory of the electron beam along the axis Z and behind the axis X. In other words, the coil 151 is positioned in the extension of the axis Z, in the half space defined by the plane perpendicular to the axis Z containing the axis X, this half space comprising the free end 132 of the arm 13. The coil 151 is therefore not passed through by the electron beam. The current flowing through the coil 151 may be adjusted on the basis of the voltage U so as to produce a deflection angle equal to or substantially equal to 90°. A 90° deflection of the electron beam makes it possible to orient the electron beam in a direction normal to the surfaces to be welded. A normal incidence of the beam makes it possible to obtain the smallest possible surface impact area. However, by controlling the current flowing in the coil 151, it is possible to vary the deflection angle around the angle of 90°. It is thus possible to generate an oscillation or a vibration of the electron beam on either side of the interface 23 between the two parts to be welded. Such oscillation may sometimes be useful for stirring the weld pool and making the molten portion more homogeneous, as well as for obtaining a surface state of the weld bead that is as smooth as possible.

The deflection means 15 comprises a magnetic core 152 arranged inside the coil 151, a first metal plate 153 linked to the magnetic core 152 and a second metal plate 154 linked to the magnetic core. The two plates 153, 154 are connected to the magnetic core 152 via two pole flanks 158. These pole flanks 158 are in contact both with the magnetic core 152 and with the plates 153, 154. A field line 157 produced by the coil 151 is illustrated in particular in FIG. 7: it passes, in succession, through the magnetic core 152, a first pole flank 158, the first plate 153, the air gap EF, the second plate 154, and the second pole flank 158. The first plate 153 and the second plate 154 are arranged symmetrically on either side of the electron beam FE, that is to say on either side of the axis Z. They both extend in a plane parallel to the axes X and Z and are spaced apart by an air gap EF through which the electron beam passes. They are positioned in front of the coil 51 along the axis Z. The two plates 153, 154 have a curved quarter-circle shape, which may be seen in FIGS. 4, 9 and 11. More precisely, these plates may have the shape of a segment of a ring but, as a variant, they could have a different shape. The two plates 153, 154 each have an entrance face 155 and an exit face 156. The entrance faces are the sides of the two plates 153, 154 that face the incident electron beam. The exit faces are the sides of the two plates 153, 164 that face the electron beam emerging from the deflection means 15. The entrance and exit faces may be defined in the thickness of the two plates 153, 154. The entrance faces 155 of the two plates form an angle A1 with the axis X. Preferably, the angle A1 may be between 15° and 40° inclusive, preferably between 25° and 35° inclusive, or even between 28° and 33° inclusive. The exit faces 156 of the two plates form an angle A2 with the axis Z. Preferably, the angle A2 may be between 0° and 15° inclusive, preferably between 5° and 12° inclusive. The values of the angles A1 and A2 play an important role in the quality of the deflection of the electron beam carried out by the deflection means 15. These angle A1 and A2 values make it possible to obtain a substantially 90° deflection of the electron beam FE while at the same time minimizing the modifications of its density distribution. Such angle A1 and A2 values make it possible to obtain a good compromise between a sufficiently large active surface of the two plates 153, 154, on the one hand, and a well-controlled focusing effect of the magnetic field linked to edge effects of the two plates 153, 154, on the other hand. The entrance face 155 and the exit face have dimensions large enough for the electron beam to be bathed in a regular and homogeneous magnetic field. The plates 153, 154 are positioned along the curvature that the electron beam follows when it is deflected by the deflection means. These plates 153, 154 make it possible to guide and concentrate the magnetic field produced by the coil 151 along the trajectory followed by the electron beam. With this arrangement of the deflection means 15, the magnetic field produced by the coil 151 is effectively concentrated in an area useful for deflecting the electron beam.

According to one variant embodiment that is not shown, the single coil 151 could be replaced by two separate coils, each of these two coils being coupled laterally to the two plates 153, 154. However, such an embodiment could lead to magnetic field leaks.

With reference to FIGS. 8 to 12, the welding apparatus also comprises a video borescope 16, or camera, for observing the site of impact of the electron beam FE on the part to be welded. The video borescope 16 makes it possible in particular to inspect the appearance of the weld bead. It may be connected to an observation screen positioned outside the enclosure 2. The video borescope extends inside the arm 13 substantially along an axis parallel to the axis Z, that is to say parallel to the flow of electrons FE before it reaches the deflection means 15. It comprises an optical cell 161 that makes it possible to capture images along a direction parallel to the axis X, and a lighting means 162 for observing the weld in the best possible lighting conditions.

The video borescope is able to be retracted, or in other words telescopic, parallel to the axis Z. When the video borescope is in the retracted position, it occupies a position behind the two plates 153, 154 of the deflection means. This position is illustrated in particular in FIG. 4. The video borescope is then located inside a volume defined by the projection of the deflection means 15 along the axis Z. Specifically, the size of the deflection means 15 along the axis X is greater than the size of the other elements 14, 18, 31, 32, 33 that are fitted on the arm 13 along this same axis. In particular, the coil 151 along with the two plates 153, 154 are the bulkiest elements of the arm 13, and they define the value of the diameter D1. By positioning the video borescope along the elements 14, 18, 31, 32, 33, and behind the two plates 153, 154, it is integrated into the arm 13 without increasing its diameter. It will be noted in FIG. 4 that the axis along which the electron beam FE is established along the arm 13 is offset by a value D2 with respect to the axis of revolution Z1 of the cylindrical envelope of the arm. This arrangement makes it possible to retain a small diameter of the arm D1. The arm 13 may therefore be inserted into axisymmetric parts having a small internal diameter.

When the video borescope is in the retracted position, this prevents it from being reached by metal particles that are released during the welding process. When it is in the deployed position, the optical cell 161 coincides with an aperture through which the electron beam is able to be emitted out of the welding apparatus. This aperture is as small as possible, such that the metal pollution released by the welding process does not reach the magnetic poles or the video borescope.

As a variant, the video borescope might not be able to be retracted and, in this case, it is the parts that are welded to one another that could be moved so as to be in the field of view of the optical cell 161. However, this variant would require a cover or a shutter to protect the video borescope during welding. According to another variant, the video borescope could be positioned at the front end of the arm. When the welding device is used to weld cells comprising an aperture the diameter of which is ever so slightly greater than the diameter of the arm, the video borescope could be protected by being positioned at this aperture, or even beyond this aperture, when the electron beam is active. In this configuration, there would be no need for a specific mobile cover to protect the video borescope.

Figure 12:
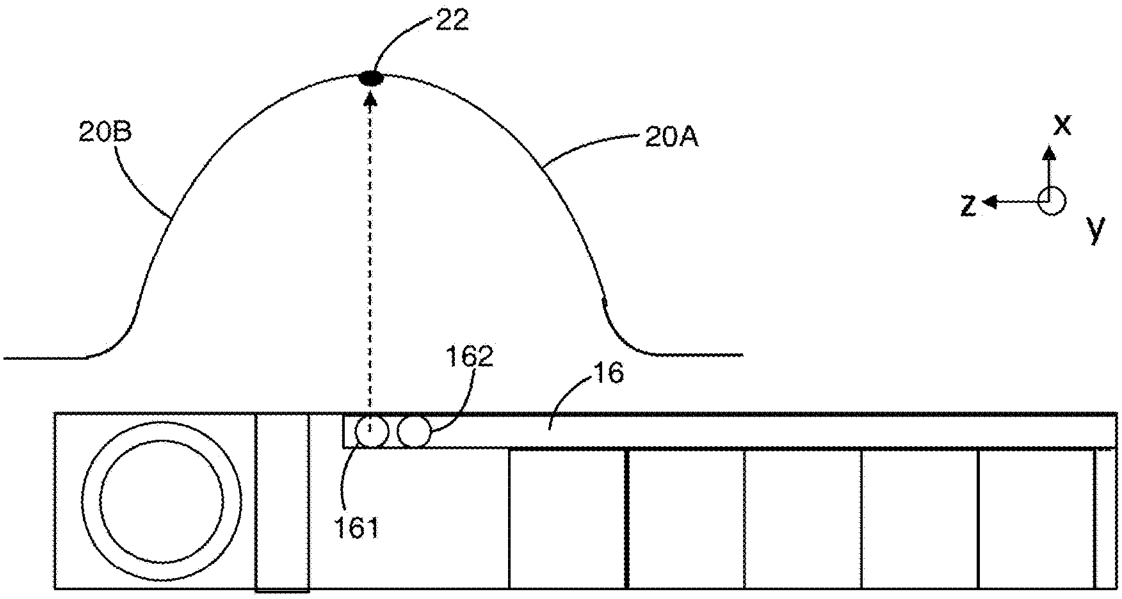
FIG. 12 is a sectional plan view of the end of the arm, the arm comprising a video borescope in the deployed position.

When it is desired to use the video borescope to observe the weld, the video borescope is deployed forward between the first plate 153 and the second plate 154, as may be seen in FIG. 12. The electron beam is then interrupted so as not to damage the video borescope. The video borescope makes it possible to observe the weld bead 22 with the same incidence as the electron beam, that is to say with an incidence normal to the weld bead and without having to move the parts to be welded. The forward and backward translational movement of the video borescope may be obtained for example using an actuator and automatically, without it being necessary to intervene manually on the welding apparatus, and therefore without interrupting the vacuum prevailing in the enclosure 2. In particular, the translational movement of the video borescope may be limited by a stop element, thus ensuring reproducible positioning of the video borescope, and therefore precise adjustment of the beam on the welding interface.

The welding apparatus moreover comprises a centering means for centering the electron beam. The centering means makes it possible in particular to center the electron beam between the two plates 153, 154 of the deflection means. To this end, the centering means comprises a deflecting means 17 for deflecting the electron beam and a detection means 18 for detecting the position of the electron beam. The deflecting means 17 is positioned directly downstream of the focusing means 12, while the detection means 18 is positioned upstream of the transformation means 14. Between the deflecting means and the detection means 18 is the tubular section 19, which is clearly visible in FIG. 1, into which the electron beam passes.

The deflecting means 17 is capable of deflecting the electron beam by a small angle with respect to the axis Z (for example of the order of one or two degrees), and with great precision (for example of the order of 0.01°), so as to ensure that the electron beam is able to pass through a passage hole with a small diameter (for example with a diameter of 10 mm), at a high distance from the focusing means (for example of the order of 600 mm). According to the embodiment that is presented, the electron beam may be deflected along the axis X and along the axis Y. To this end, the deflecting means comprises two coils 171, 172 that are concentric and arranged about the axis Z. These two coils 171, 172 are visible in particular in FIG. 3. A first coil 171 is configured so as to deflect the electron beam along the axis X and the second coil 172 is configured so as to deflect the electron beam along the axis Y. The first coil 171 is arranged so as to produce a magnetic field parallel to the axis Y and the second coil 172 is arranged so as to produce a magnetic field parallel to the axis X. As an alternative, these two coils could be arranged differently. In particular, the first coil 171 could be arranged so as to produce a magnetic field parallel to the axis X and the second coil 172 could be arranged so as to produce a magnetic field parallel to the axis Y. By controlling the current flowing through the first coil 171, the deflection of the electron beam is adjusted along the axis X and, by controlling the current flowing through the second coil 172, the deflection of the electron beam is adjusted along the axis Y.

Figure 13:
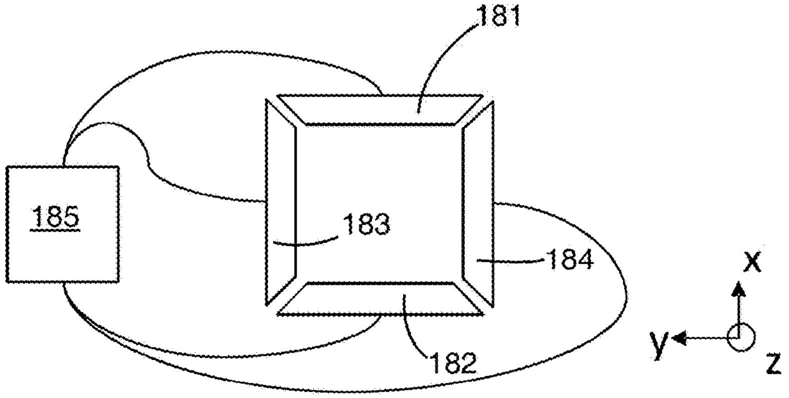
FIG. 13 is a schematic front view of a detection means of the welding apparatus.

The detection means 18, shown in FIG. 13, comprises four electrodes 181, 182, 183, 184 arranged on the four sides of a square around the channel through which the electron beam passes, that is to say about the axis Z. The four electrodes may be substantially identical to one another. They are positioned with right-angle rotational symmetry. The first electrode 181 and the second electrode 182 comprise an edge facing and parallel to the axis Y. Likewise, the third electrode 183 and the fourth electrode 184 comprise an edge facing and parallel to the axis X. It should be noted that the arrangement of the four edges of the electrodes could deviate from a square shape, for example rather follow the shape of a rectangle while at the same time remaining within the boundaries of the invention. Each electrode is capable of detecting contact with the electron beam. In particular, each electrode may be connected to an electronic control unit 185 by an electrical connection. When electrons of the electron beam strike one of the electrodes, a signal is detected by the electronic control unit 185. This electronic control unit 185 is also connected to the deflecting means 17, and may implement a method for adjusting or centering the electron beam, which will be detailed below. The electrodes 181, 182, 183, 184 may have a substantially trapezoidal shape and be solid enough to withstand contact with the electron beam, even at full power, without generating excessively great heating. The mass of the electrodes makes it possible to reduce the rise in temperature to the greatest possible extent, and therefore makes it possible to preserve these electrodes. The trapezoidal shape makes it possible to use the maximum volume available within the limits of the cylindrical envelope of the arm 13. Advantageously, the large base of the trapezoidal shape could even have a curved shape matching the cylindrical envelope of the arm. The four electrodes may be connected to ground during the welding process.

As a variant, the deflecting means 17 could be simplified and be capable only of deflecting the electron beam along a single axis perpendicular to the axis Z. The detection means could then comprise only two electrodes arranged so as to detect a deflection of the electron beam. It would thus already be possible to adjust the position along an axis perpendicular to the axis Z, for example along the axis X or along the axis Y.

According to another variant embodiment, the deflecting means 17 could be replaced by an advantageously motorized articulation of the assembly formed by the electron gun 11 and the focusing means 12. This would thus avoid deflecting the electron beam via the deflecting means 17. This would therefore avoid aberrations or distortions of the electron beam caused by deflection thereof. Such a setup could therefore make it possible to further increase the precision of the electron beam, but the centering procedure would be slower. This articulation could be in the form of a turntable mounted with a connection that slides along the axis X and/or along the axis Y. Such a turntable would allow the electron beam to be moved in translation parallel to the axis X and/or to the axis Y.

The focusing means 12, the deflecting means 17, the detection means 18, the transformation means 14 and the deflection means 15 are means that are separate from one another. They are arranged, in the order mentioned, along the path of the electron beam. These means are centered mechanically with respect to one another, that is to say that the centers of these various elements or means are aligned and coincident with the axis Z. As a variant, some positions could be swapped. For example, the deflecting means 17 could be positioned upstream of the focusing means 12. As another alternative, the transformation means 14 could be positioned upstream of the detection means 18.

Figure 4:
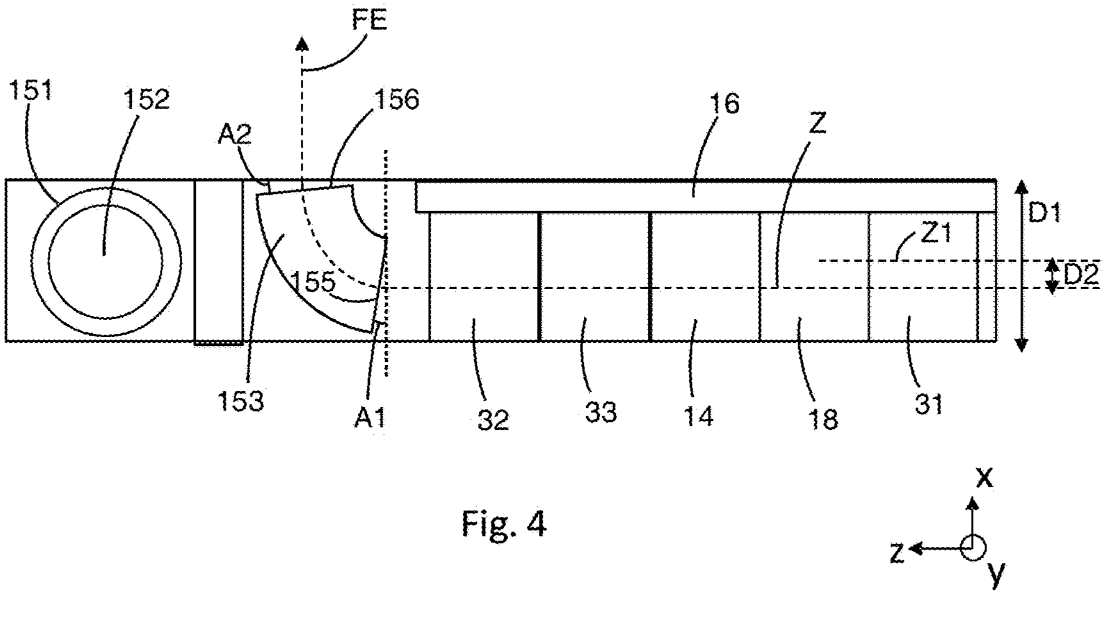
FIG. 4 is a sectional plan view of a second portion of the welding apparatus.

As illustrated in FIG. 4, the welding apparatus may furthermore comprise various elements or devices interposed between the means 12, 14, 15, 17 and 18. Among these elements or devices, the welding apparatus comprises a protective diaphragm 31. The protective diaphragm is a solid ring comprising a central aperture that allows the electron beam to pass when it is sufficiently well-centered. In the event of accidental deflection of the electron beam, for example following an incorrect manipulation, the electron beam strikes the solid portion of the protective diaphragm that is designed to withstand high-energy impacts. This thus prevents the electron beam from striking a more sensitive element of the welding apparatus. Advantageously, the protective diaphragm 31 is positioned in front of the detection means 18, just after the tubular section 19.

The welding apparatus also comprises a magnetic field blocking element 32 interposed between the transformation means 14 and the deflection means 15. The magnetic field blocking element is also in the form of a solid ring having a central aperture through which the electron beam passes. The dimensions of these elements 32 are defined so as to magnetically isolate the transformation means 14 from the deflection means 15. The magnetic field generated by the coils of the transformation means thus does not affect the operation of the deflection means, and vice versa. The magnetic field blocking element 32 is surrounded by an aluminum body 33 that is cooled by a cooling system comprising pipes. As an option, such a magnetic field blocking element could be located between any two other means of the welding apparatus, for example between the focusing means 12 and the deflecting means 17, or even not be used in order to simplify the welding apparatus.

The welding apparatus furthermore comprises a heat shield that is cooled by the cooling system; this heat shield is positioned in front of the coil 151 of the deflection means 15. Thus, if a portion of the electrons of the electron beam is not deflected by 90° by the deflection means, this portion strikes the heat shield instead of striking the coil 151 positioned behind the heat shield.

The welding apparatus also comprises a protective cover (not shown). The protective cover is positioned so as to collect metal projections coming from the parts to be welded. Specifically, under the impact of the electron beam, metal particles coming from the parts to be welded may evaporate and then attach to the welding apparatus or to other portions of the parts to be welded. The protective cover therefore serves to prevent these projections from damaging the deflection means 15 or the parts to be welded. When it is worn out, the protective cover may easily be replaced without having to change the deflection means. Advantageously, the protective cover is integrated into the cylindrical profile of the arm, flush with the two plates 153, 154 along the axis X. Integrating the protective cover thus does not increase the diameter of the arm.

A description will now be given of a method for welding two axisymmetric parts according to one embodiment of the invention.

Beforehand, two parts 20A, 20B are positioned in the welding device such that the interface 23 between these two parts is facing the exit of the electron beam. This interface 23 corresponds to an internal perimeter of the assembly formed by the two parts to be welded. The assembly of the two axisymmetric parts intended to be welded to one another are inserted around the arm 13 of the welding apparatus. The two parts to be welded may be held by a gripping device. The gripping device comprises a rotating connection means for rotating the assembly of the two parts to be welded during the welding process. The setup that is obtained is illustrated schematically in FIG. 15.

The enclosure is then closed and a vacuum is created in the enclosure. The welding apparatus may be powered on so as to obtain an electron beam FE. At this stage, the electron beam is not necessarily centered, that is to say that the center of the electron beam might not pass through the center of the transformation means 14.

Prior to the actual welding operation, the electron beam may be centered. This operation consists in determining the position of the edges of the electron beam and in deducing therefrom an offset value of the electron beam by taking several steps.

In a first step, the deflecting means 17 is controlled so as to obtain a step of deflecting the electron beam in an oscillating manner with increasing amplitude along the axis X, for example a sinusoidal deflection. To this end, a sinusoidal current of increasing amplitude may flow in the first coil 171. The electron beam then oscillates in a first plane, parallel to the axes X and Z, around its original position FE0. This first plane is delimited on either side by the first electrode 181 and the second electrode 182.

Since the deflection amplitude increases over time, the electron beam ends up touching one of the two electrodes 181, 182, for example the first electrode 181. In a second step, the contact of the electron beam on the electrode 181 is detected by the electronic control means 185. The deflection amplitude is then set at the value reached at the time when the electron beam comes into contact on the first electrode 181.

In a third step, the sinusoidal deflection of the electron beam along the axis X is continued, but while still maintaining a constant deflection amplitude, i.e. the one that was set in the previous step. The electron beam always oscillates in the first plane. A first offset that increases over time is then applied to the electron beam so as to gradually shift it toward the electrode opposite the one that was touched by the electron beam, that is to say the second electrode 182 in this example.

Since the electron beam is gradually shifted toward the second electrode 182, the electron beam ends up touching this second electrode 182 with the same amplitude as during the contact on the first electrode 181. In a fourth step, the contact of the electron beam on the electrode 182 is detected by the electronic control means 185. The value of the offset OF1 applied to the electron beam is then recorded.

In a fifth step, the electron beam is actually centered. Starting from the initial position of the beam FE0, an offset corresponding to the previously recorded value of the offset OF1 divided by two is applied thereto. This thus gives an electron beam centered along the axis X between the two electrodes 181 and 182.

FIG. 14 also makes it possible to clearly see the centering process. The upper graph in FIG. 14 shows the position of the electron beam FE relative to the axis X as a function of time. The two electrodes 181 and 182 are shown schematically by dark bands at the top and at the bottom of the graph. In this example, it is observed that the initial position FE0 of the electron beam is slightly shifted toward the electrode 181. The curve FEmoy represents the average position of the electron beam relative to the axis X about which the sinusoidal deflection is applied. OF1 denotes the value of the offset recorded during the fourth step. X0 denotes the offset along the axis X that will be applied to the electron beam in order to center it between the two electrodes 181 and 182. This therefore gives X0=OF1/2. In practice, this offset may be obtained by channeling a current of constant value in the first coil 171. In FIG. 14, the lower graph shows the signals S1 and S2 detected by the electronic control means 185 when the beam comes into contact with the electrode 181 and then with the electrode 182.

The same approach is then taken to center the beam relative to the axis Y, the electron beam then oscillating between the electrodes 183 and 184. The centering of the electron beam along the axis Y may affect the centering along the axis X carried out previously, in particular in the event of a lack of squareness of the coils 171, 172 of the deflecting means. Advantageously, the centering along the axis X and along the axis Y may be repeated a second time, or even a greater number of times in order to center the electron beam through successive iterations. This centering process is completely automatic and does not require manual intervention on the welding apparatus or interruption of the vacuum prevailing in the enclosure 2. It may even be repeated at the end of a welding step in order to ensure that the beam has not been deflected off center. The operation of centering the electron beam may be carried out at low power so that there is no risk of the electron beam damaging or marking the two parts to be welded. Optionally, a cover could be used to prevent the electron beam from reaching the parts to be welded during the centering process that has just been described. As a variant, the deflection amplitude of the electron beam could oscillate not in a sinusoidal shape but in a triangular shape, a crenellated shape, or else any other alternating shape that produces a symmetrical pattern. Optionally, the centering could also be carried out using a martyr target instead of the parts to be welded. It should be noted that an intentional offset or off-centering may also be applied in order to intentionally shift the electron beam, but in a controlled and reproducible manner.

Once the electron beam has been centered, a step of calibrating the transformation means is carried out so as to produce an electron beam comprising a predefined density distribution at the output of the welding apparatus. Specifically, particular density distributions may be desired in order to carry out various welding steps. The density distribution is able to be adjusted by virtue of the transformation means 14, but also by virtue of the focusing means 12. Adjusting the currents flowing through the respective coils of these two means 12, 14 makes it possible to modify the density distribution of the beam. When the focal point PF is located upstream of the transformation means, the electron beam incident in the transformation means 14 is divergent, and the variations in the currents through the coils 141A, 141B, 141C and 141D produce a first geometric modification of the density distribution of the electron beam. When the focal point PF is located downstream of the transformation means, the electron beam incident in the transformation means 14 is convergent, and the variations in the currents through the coils 141A, 141B, 141C and 141D produce a second geometric modification of the density distribution of the electron beam, different from the first geometric modification. The current flowing through the coil 121 and the current flowing through the four coils 141A, 141B, 141C and 141D therefore constitute two adjustment parameters that an operator may use to implement varied density distributions. The density distributions that are obtained may have a rotational symmetry or be more or less elongated parallel to the interface 23 or perpendicular to the interface 23.

Downstream of the transformation means 14, the density distribution may thus have a circular shape, but also an ovoid shape elongated along the axis Z or elongated along the axis Y or else elongated along any axis perpendicular to the axis X. However, the deflection means 15 interferes with the density distribution of the electron beam obtained directly at the output of the transformation means 14. Specifically, the 90° deflection of the electron beam by the deflection means inexorably causes a modification of the density distribution of the electron beam. It is therefore necessary, at the transformation means 14, to anticipate the deformations produced by the deflection means 15 in order to be able to obtain a predefined density distribution at the output of the welding apparatus.

FIGS. 15A, 15B and 15C illustrate various forms of projection of the electron beam onto the two parts to be welded. These depictions are taken from the results of tests of the welding apparatus 10. They may in particular be obtained using an electron beam analyzer.

As illustrated in FIG. 15A, the calibration step may be defined so as to produce an electron beam the density of which is distributed parallel to the interface between the two axisymmetric parts. This shape is particularly suitable for carrying out the actual welding operation. Specifically, an excessively high energy density could lead to welding with projection of material, this being detrimental to the quality of the finished part. By producing a beam that is more spread out along the join line between the two parts to be welded, the energy density may be reduced without enlarging the thermally affected area. The electron beam may then melt the metal, in this case niobium, on either side of the join line between the two axisymmetric parts. The width of the weld bead thus obtained may be very small. The welding is carried out using the keyhole effect. This means that the power that is imparted is such that material is evaporated at the interface between the two parts to be welded and a hole of the desired depth is created. This hole (keyhole) is then moved (or in other words "pulled") on the part through the rotation of the assembly formed by the two parts to be welded. At the hole, the material forming the two parts to be welded is melted, thereby forming a liquid bath. This bath solidifies when the electron beam moves away from this area, which is why this bath has roughly the shape of a keyhole. To form the end of the weld bead, decreasing the power and/or modifying the focusing of the electron beam allow the hole to rise to the surface (that is to say make it possible to gradually reduce the depth of the hole) of the two parts welded to one another and make it possible to obtain a smooth bead.

The electron beam may melt the metal to a depth for example of the order of 2 mm to 3 mm, or even to an even greater depth. In a first possible setting of the welding apparatus, the metal could be melted over the entire thickness of the two parts to be welded. In another setting of the welding apparatus, the electron beam does not pass completely through the thickness of the two parts to be welded. The metal is thus not melted over the entire thickness of the two parts to be welded. Minimizing the amount of energy transmitted into the materials forming the parts to be welded makes it possible to limit the size of the molten area or thermally affected area and residual stresses. This thus minimizes the deformations of the weld bead. A smoothing operation (for example by projecting an electron beam) on the outside of the interface between the two parts to be welded may subsequently make it possible to balance the stresses within the weld bead between its inner side and its outer side.

In order to weld the two axisymmetric parts to one another, the part is rotated on itself about the axis Z. To this end, the welding device may advantageously comprise a motor connected to a gripping means for gripping the parts to be welded, such as for example a mandrel. The welding apparatus remains stationary during the welding. The rotational speed of the assembly formed by the two parts to be welded may be adjusted on the basis in particular of the power of the electron beam and of the nature of the parts to be welded.

It should be noted that the position of the focal point PF may be adjusted so as to obtain more or less distant focusing of the electron beam after deflection. This may in particular be useful for welding two parts the interface of which is not a circle centered on the axis Z without having to move the two parts to be welded with respect to the welding device.

With reference to FIG. 15B, the calibration step may also be defined so as to produce an electron beam the density of which is distributed perpendicular to the interface formed between the two axisymmetric parts. This form of beam is particularly advantageous for smoothing a weld bead formed beforehand between the two parts.

With reference to FIG. 15C, the calibration step may also be defined so as to produce an electron beam the density of which is distributed in a circular and uniform manner. It is in particular possible to obtain an extremely concentrated electron beam that makes it possible to achieve extremely high powers per unit area. For example, with a voltage U between the anode and the cathode equal to 55 kV and with a current flowing from the anode to the cathode equal to 50 mA, it is possible, by virtue of the invention, to obtain an electron beam of up to 4100 W/mm2. A circular or point-shaped density distribution may be particularly useful for performing local treatment of a part, such as for example repairing a defect such as a hole, a lack of material or surface irregularities. The power of the electron beam may then possibly be lowered in order to avoid material projections. In general, the density distribution of the electron beam is adapted to the desired effects for producing the weld bead.

As illustrated in FIG. 16, the large length L1 of the arm 13 makes it possible to consider welding an assembly of cells to one another while limiting the number of manipulations and while avoiding interrupting the vacuum prevailing in the enclosure. For this purpose, the cells may be positioned beforehand against one another and held in position by specific tools. The welding apparatus may then weld the interfaces between two adjacent cells in succession. The assembly of cells is moved in translation along the axis Z between each welding operation so as to weld all of the interfaces between the cells. Advantageously, a sliding carriage housed inside the enclosure makes it possible to automatically move the assembly of cells. Since the arm 13 is able to be inserted from one side or the other of the assembly of cells to be welded, it is possible to weld an assembly of cells the total length of which reaches the length of the arm 13 multiplied by two. The welding station may also be equipped with a turning device capable of pivoting the assembly of cells by 180° so as to insert the arm 13 through the two opposite apertures of the assembly of cells in succession. As a variant, if the welding station does not have a turning device, the 180° pivoting of the assembly of cells may be carried out manually by interrupting the vacuum in the enclosure. It would thus be necessary only to interrupt the vacuum prevailing in the enclosure to weld all of the cavities. Using the welding device according to the invention therefore makes it possible to avoid excessively frequent interruption of the vacuum in the enclosure. An interruption is in particular not necessary for welding each cell or subassembly of cells.

Since the electron beam is guided precisely inside the arm as far as the deflecting means, it is possible to consider arms of greater length than the welding apparatuses from the prior art. This greater length may make it possible to position four cells and even more than four cells around the arm 13, as well as tube elements and/or flanges associated with the cells. The assembly process is thus facilitated. In addition, with such a long arm 13, it is possible, with the electron beam, to reach any point inside a cavity formed by an assembly of multiple cells that are already assembled. For example, it is possible to reach any point of an assembly of nine cells that are already assembled with one another. This is particularly useful for repairing a defect that is detected after the cells have been assembled.

By virtue of the invention, it is therefore possible to weld an assembly of cells with a length of 1200 mm, or even 1300 mm, or even an even greater length, with a minimum number of manipulations and with a very high level of quality of the weld bead.

The invention claimed is:

1. An electron beam welding apparatus, comprising:

an electron gun capable of generating an electron beam a focusing means capable of orienting the electron beam along a first axis an arm extending parallel to the first axis, the arm comprising:

a transformation means for transforming a density distribution of the electron beam in a plane perpendicular to the first axis, and a deflection means for deflecting the electron beam along a second axis perpendicular to the first axis.

2. The welding apparatus as claimed in claim 1, further including that the transformation means comprises at least two coils, the at least two coils forming a magnetic axis, perpendicular to said first axis, the at least two coils being distributed about said first axis so as to produce an alternation of North magnetic poles and South magnetic poles.

3. The welding apparatus as claimed in claim 1, further including that the electron gun, the focusing means, the transformation means and the deflection means are arranged in this order along the path of the electron beam, the focusing means comprising a variable focal length, the focusing means being capable of focusing the electron beam at a focal point positioned upstream of the transformation means and the focusing means being capable of focusing the electron beam at a focal point positioned downstream of the transformation means.

4. The welding apparatus as claimed in claim 1, further including that the deflection means comprises a coil capable of producing a magnetic field oriented perpendicular to said first axis when said coil is flowed through by an electric current, said coil being positioned in the extension of the first axis, behind said second axis.

5. The welding apparatus as claimed in claim 4, further including that the deflection means comprises a magnetic core arranged inside said coil, a first metal plate linked to the magnetic core by a first pole flank, a second metal plate linked to the magnetic core by a second pole flank, a first plate and a second plate being arranged symmetrically on either side of said first axis, the first plate and the second plate each comprising an entrance face and an exit face, the entrance face forming an angle of between 15° and 40° inclusive with said second axis, the exit face forming an angle of between 0° and 15° inclusive with said first axis.

6. The welding apparatus as claimed in claim 1, further including that the video borescope is able to be retracted parallel to the first axis, (Z), and in that it is able to extend between the first plate and the second plate.

7. The welding apparatus as claimed in claim 1, further including that it comprises a video borescope for observing an impact of the electron beam, the video borescope extending along an axis parallel to said first axis, the video borescope being positioned behind the deflection means within a volume defined by the projection of the deflection means along said first axis.

8. The welding apparatus as claimed in claim 1, further including that it comprises

- a protective diaphragm for protecting an element of the welding apparatus from the electron beam in the event of accidental deflection of the electron beam, and/or,
- in that it comprises a magnetic field blocking element interposed between the transformation means and the deflection means, and/or,
- in that it comprises a heat shield, in particular a heat shield that is cooled by a cooling system, and/or,
- in that it comprises a protective cover positioned so as to protect a part to be welded and/or an element of the welding apparatus from metal projections coming from a part to be welded.

9. The welding apparatus as claimed in claim 1, further including that

- the arm comprises the overall shape of a cylinder, said cylinder comprising an axis of revolution offset by a non-zero value with respect to said first axis, and/or
- said cylinder comprising a diameter less than or equal to 80 mm, and/or
- said cylinder comprising a length along said first axis greater than or equal to 200 mm.

10. The welding apparatus as claimed in claim 1, further including that it comprises:

- a deflecting means for deflecting the electron beam, and
- a detection means for detecting the position of the electron beam, the detection means comprising two electrodes arranged on either side of the first axis, each electrode being capable of detecting contact with the electron beam.

11. A method for adjusting a welding apparatus as claimed in claim 10, further including that it comprises:

- a step of deflecting the electron beam in an oscillating manner, the electron beam oscillating in a first plane defined between the first electrode and the second electrode of the detection means, the second electrode being opposite the first electrode with respect to the electron beam, the amplitude of the oscillation increasing over time, and then
- a step of detecting contact of the electron beam on an electrode from among the first electrode and the second electrode, and then
- a second step of deflecting the electron beam in an oscillating manner, the electron beam oscillating in the first plane, the amplitude of the sinusoid being kept at the value reached at the time when the electron beam comes into contact on said electrode, a first offset that increases over time being applied to the electron beam so as to gradually shift it toward the other electrode from among the first electrode and the second electrode, and then
- a step of detecting contact of the electron beam on said other electrode, and then
- a step of centering the electron beam by shifting the electron beam toward said other electrode by a value equal to the first offset applied to the electron beam at the time when it comes into contact with said other electrode divided by two.

12. A method for adjusting a welding apparatus as claimed in claim 11, further including that the welding apparatus further comprises:

- the detection means comprising four electrodes arranged on the four sides of a square about the first axis, each electrode being capable of detecting contact with the electron beam, and that the method further comprises:

- a step of deflecting the electron beam in an oscillating manner, the electron beam oscillating in a second plane defined between a third electrode and a fourth electrode of the detection means, the fourth electrode being opposite the third electrode with respect to the electron beam, the second plane being perpendicular to the first plane, the amplitude of the oscillation increasing over time, and then
- a step of detecting contact of the electron beam on an electrode from among the third electrode and the fourth electrode, and then
- a second step of deflecting the electron beam in an oscillating manner, the electron beam oscillating in the second plane, the amplitude of the oscillation being kept at the value reached at the time when the electron beam comes into contact on said electrode, a second offset that increases over time being applied to the electron beam so as to gradually shift it toward the other electrode from among the third electrode and the fourth electrode, and then
- a step of detecting contact of the electron beam on said other electrode, and then
- a step of centering the electron beam by shifting the electron beam toward said other electrode by a value equal to the second offset applied to the electron beam at the time when it comes into contact with said other electrode divided by two.

13. The welding apparatus as claimed in claim 1, further including that it comprises:

a deflecting means for deflecting the electron beam, and a detection means for detecting the position of the electron beam, the detection means comprising four electrodes arranged on the four sides of a square about the first axis, each electrode being capable of detecting contact with the electron beam.

14. A welding device, comprising a frame intended to rest on a ground and a welding apparatus as claimed in claim 1, the welding apparatus being able to move in rotation about said first axis with respect to the frame.

15. A method for welding two parts comprising a central aperture, by way of an electron beam generated by a welding apparatus as claimed in claim 1, comprising:

a step of positioning the two parts that are intended to be welded to one another around the arm of the welding apparatus, a step of calibrating the transformation means so as to produce an electron beam comprising a predefined density distribution at the output of the welding apparatus, a step of projecting an electron beam onto an interface formed between the two parts.

16. The welding method as claimed in claim 15, further including that the calibration step is defined so as to produce an electron beam the density of which is distributed either parallel to an interface formed between the two parts or perpendicular to an interface formed between the two parts, or in a circular and uniform manner, or in any intermediate form between a distribution parallel to the interface and a circular and uniform distribution, or in any intermediate form between a distribution perpendicular to the interface and a circular and uniform distribution, and in that the projection step is a step of welding the two parts, or a step of smoothing a weld, or a step of locally repairing a weld.

17. The welding method as claimed in claim 15, further including that the calibration step is defined so as to produce an electron beam the density of which is distributed perpendicular to an interface formed between the two parts, and in that the projection step is a step of smoothing a weld formed beforehand between the two parts.

18. The welding method as claimed in claim 15, further including that the calibration step is defined so as to produce an electron beam the density of which is distributed in a circular and uniform manner, and in that the projection step is a step of locally repairing a weld or a step of treating the end of the bead of a weld, the power of the electron beam in particular being gradually reduced to zero when the electron beam reaches the end of the weld bead.

19. The welding method as claimed in claim 15, further including that the electron gun comprises an anode and a cathode, a voltage between the anode and the cathode being less than or equal to 60 kV during the projection step.

* * * * *